Feb. 13, 1934.   A. J. MEYER   1,947,213
INTERNAL COMBUSTION ENGINE
Filed Oct. 9, 1930
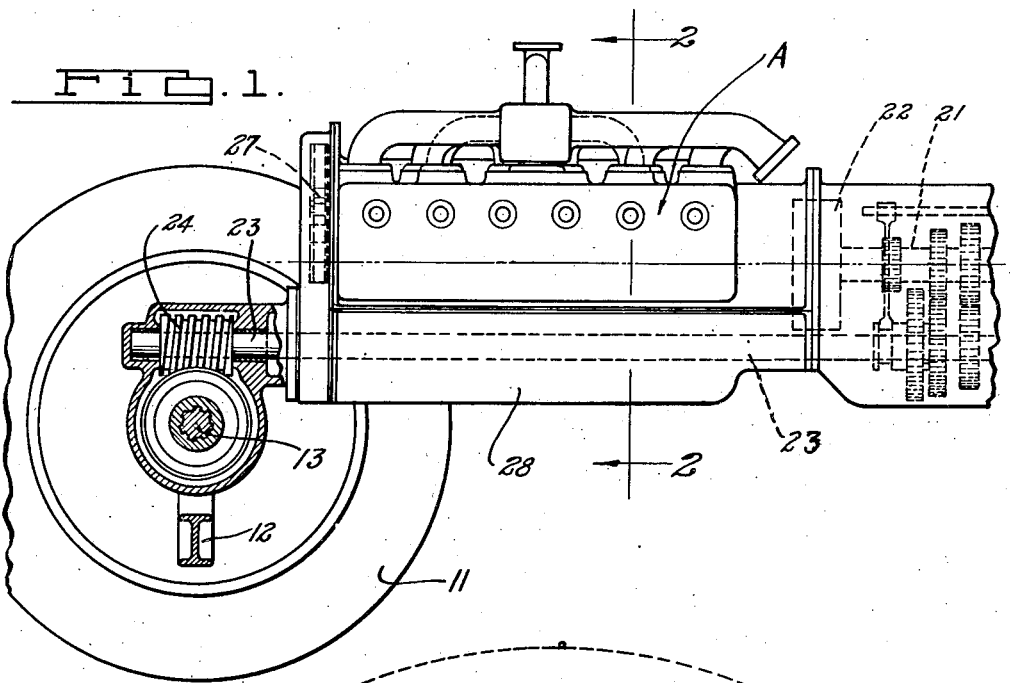
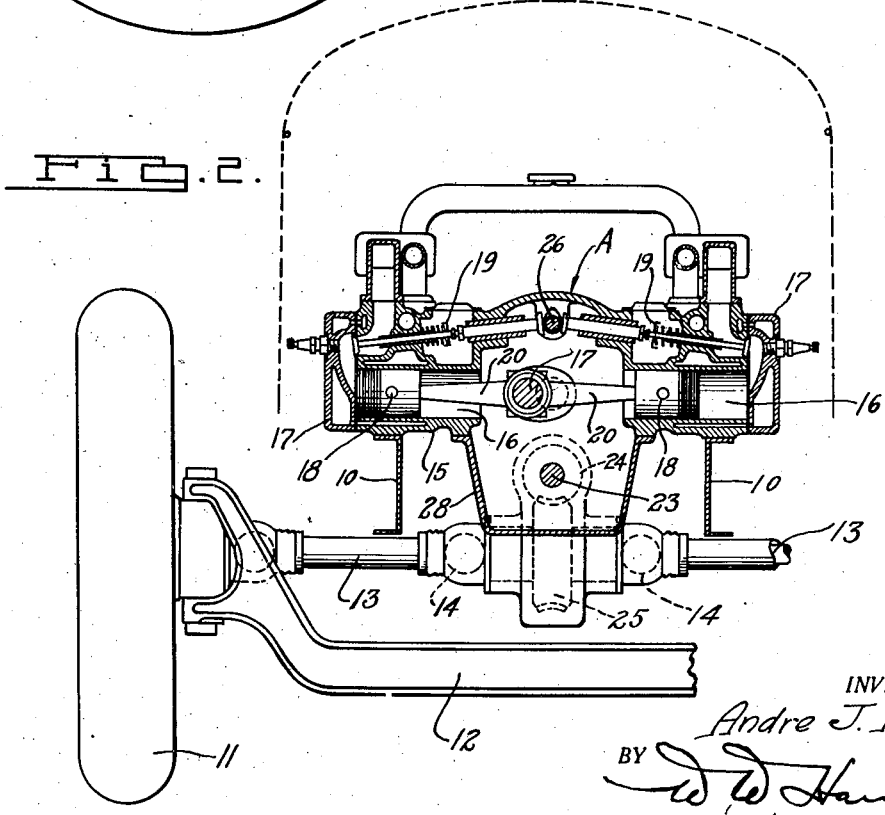
INVENTOR.
Andre J. Meyer.
BY
ATTORNEY.

Patented Feb. 13, 1934

1,947,213

UNITED STATES PATENT OFFICE 1,947,213

INTERNAL COMBUSTION ENGINE

Andre J. Meyer, Detroit, Mich., assignor to Continental Motors Corporation, Detroit, Mich., a corporation of Virginia Application October 9, 1930. Serial No. 487,404

28 Claims. (Cl. 180—42)

My invention relates to internal combustion engines of the type adapted for association with self-propelled vehicles of the front wheel drive type, and more particularly my invention relates to the means for transmitting the power from the engine to the front wheels of such a vehicle.

One of the objections to the present day type of front wheel drive vehicles is the excessive length of hood employed to cover the engine and the driving mechanism that is associated therewith and located to the front of the engine which requires an expensive and complicated system of remote control for operating the clutch and transmission. There is sufficient space in rear wheel drive vehicles at the rear of the engine underneath the foot boards to house the clutch and transmission conveniently located with respect to the clutch pedal and gear shift lever. With front wheel drive vehicles this space to the rear of the engine underneath the footboards is not utilized.

A multi-cylinder engine of the type having opposed cylinders lying in a horizontal plane has many advantages over the in-line engine and the V-type engine. On rear wheel drive vehicles the use of the horizontally opposed cylinders is restricted because of the fact that the crankshaft should be positioned in a horizontal plane that preferably substantially coincides with the horizontal plane of the rear axle. Thus it has been found that this type of engine cannot be readily adapted for the ordinary passenger vehicle since the cylinders would have to be located between the side frames of the chassis where they are inacessible, and as a result its use has been restricted to the larger type of busses and trucks. I find that this type of engine is well adapted for use with a front wheel drive vehicle having a power transmission positioned rearwardly of the engine and provided with a separate power shaft for connecting the power transmission means with the wheel driving shaft since the power shaft may be positioned closer to the horizontal plane of the wheel axes than the engine crankshaft which permits the power shaft to be readily connected with the wheel driving shaft, but which permits the cylinders to be located above the side frames of the chassis.

One of the objects of my invention is to provide an improved assembly of an engine and driving mechanism, thereby facilitating the assembly thereof with a front wheel drive vehicle with a minimum of labor and expense and eliminating the complicated and expensive remote control devices.

Another object of my invention is to provide an improved arrangement of the engine and the driving mechanism associated therewith that utilizes the available space to the best advantage for maintaining the overall length and height of the vehicle at a minimum.

Another object of my invention is to provide a novel arrangement for operatively connecting an engine having horizontally opposed cylinders with a front wheel drive vehicle.

It is a further object of my invention to provide the aforesaid simplified arrangement of engine and driving mechanism for the vehicle front wheels while at the same time retaining the advantages of a low center of gravity for the engine location and for the vehicle in general. One important advantage derived by my invention resides in a novel location of power shaft for the vehicle front wheels whereby the engine may be located and mounted in an advantageous position.

By reason of my invention the available space in a vehicle chassis is utilized to an improved degree, the advantages of the front wheel drive being retained without the usual disadvantages aforesaid, greater space in a given chassis length being available for the body.

For a more detailed understanding of my invention, reference may be had to the accompanying drawing which illustrates one form which my invention may assume, and in which:

Fig. 1 is a side elevational view partly in section of an internal combustion engine constructed in accordance with my invention and adapted for assembly with a front wheel drive vehicle, and Fig. 2 is a transverse sectional view thereof taken substantially on the line 2—2 of Fig. 1.

The internal combustion engine and associated driving mechanism illustrated in the accompanying drawing is especially adapted for use with a front wheel drive vehicle. The vehicle comprises the usual type of chassis consisting of a pair of chassis frame members 10 extending longitudinally of the vehicle, adapted for supporting the engine A. The front wheels 11 are supported by a front axle 12 and operatively connected with a driven member or wheel driving shaft 13 having suitable universal joints 14 through which the drive is transmitted.

I find that a front wheel drive mechanism constructed in accordance with my invention may be quite readily incorporated in a vehicle equipped with an internal combustion engine having horizontally opposed cylinders as illustrated in the accompanying drawing. In the illustrated embodiment of my invention the engine A comprises an engine block casting 15 having two banks of cylinders 16, the horizontal plane through the axis of the crankshaft 17 preferably containing the cylinder axes. Obviously it is not absolutely essential that the cylinders should lie in the horizontal plane as the engine cylinders may be disposed at an angle less than 180 degrees as illustrated, but I have found that an arrangement whereby the cylinders lie substantially in said horizontal plane tends to provide an engine of minimum height.

Other parts of the engine such as the cylinder heads 17, pistons 18, valve mechanisms 19 and connecting rods 20 are of standard construction, and any suitable form of intake and exhaust manifold may be employed.

A power transmission means 21 is assembled rearwardly of the engine and operatively connected with the engine crankshaft by means of a suitable clutch mechanism 22. Operatively connected with the power transmission means and extending longitudinally forwardly therefrom is a power shaft 23, said power shaft being preferably extended beyond the front end of the engine (see Fig. 1). A worm 24 is fixed or otherwise secured to the front end of the power shaft and engages the worm gear 25 operatively carried by the wheel driving shaft 13. Obviously any suitable means for operatively connecting the wheel driving shaft to the power shaft may be employed, the structure herein described and illustrated in the drawing showing one embodiment of my invention. Any suitable type of differential may be employed.

In the illustrated embodiment of my invention, the cam shaft 26 is positioned above the horizontal plane of the engine containing the crankshaft axis and is driven by said crankshaft through the agency of a chain 27 or other suitable driving connection, said camshaft being preferably operated at one half crankshaft speed.

It is noted that the power shaft 23 lies above the horizontal plane containing the wheel axes and also above the horizontal plane containing the axis of the wheel driving shaft 13 that is preferably positioned substantially in the aforesaid plane containing the wheel axes. Furthermore the power shaft lies below the lowermost position of the crank pins of the engine crankshaft. Thus the power shaft extending longitudinally of the engine lies intermediate the horizontal planes respectively containing the axis of the crankshaft and the axis of the wheel driving shaft.

The engine block is supported directly on the chassis frames 10 and the crankcase 28, which is secured to said engine block, is suspended intermediate the chassis frames. The power shaft 23 is preferably extended longitudinally through the crankcase as shown in the drawing.

It will be noted that the novel front wheel drive structure herein described and claimed, provides a unitary structure that may be readily assembled in a vehicle of standard dimensions and on a chassis of standard length. Further, it will be observed that I have provided a very compact assembly and have employed means for transmitting the motive power that efficiently utilizes all the available space so that the engine and associated driving mechanism can be contained or housed under a hood of practically standard dimensions for rear wheel drive vehicles.

The type of engine herein illustrated which is provided with horizontally opposed cylinders becomes a very practical structure when cooperatively associated with my novel front wheel drive mechanism. The engine height is maintained at a minimum and the vertical distances between the crankshaft, power shaft, and the wheel driving shaft are held within the desired limits necessary for transmitting the motive power according to the best engineering practice. My whole structure does not depart from what is considered good engineering practice and as a result I find that I have provided a front wheel drive power plant and drive that can be economically and efficiently manufactured. The power plant and associated front wheel drive mechanism comprising the power transmission means, the power shaft, and the wheel driving shaft, may be produced as a unitary structure, this unitary assembly materially facilitating the manufacture of front wheel drive vehicles as well as permitting the economical and ready maintenance thereof.

Although I have illustrated but one form of my invention and have described in detail but a single application thereof, it will be apparent to those skilled in the art to which my invention pertains that various modifications and changes may be made therein without departing from the spirit of my invention or from the scope of the appended claims.

What I claim as my invention is:

1. In a vehicle of the character described, the combination of a chassis and engine supported thereby, said engine provided with aligned cylinders having axes inclined with respect to the vertical central longitudinal plane of the vehicle, said engine being further provided with a crankshaft having an axis contained in said vertical central longitudinal plane of the vehicle, front vehicle wheels adapted to be driven by said engine, power transmission means positioned rearwardly of said engine, and driving means extending from said power transmission means and operatively connected to drive said front vehicle wheels, said driving means including a wheel driving shaft and a power shaft positioned in said vertical central longitudinal plane of the vehicle and in a horizontal plane below the crankshaft axis and above the horizontal plane containing the axis of the wheel driving shaft.

2. In a vehicle of the character described, the combination of a chassis and engine supported thereby, said engine provided with aligned cylinders having axes inclined with respect to the vertical central longitudinal plane of the vehicle, said engine being further provided with a crankshaft having an axis contained in said vertical central longitudinal plane of the vehicle, front vehicle wheels adapted to be driven by said engine, power transmission means positioned rearwardly of said engine, and driving means extending from said power transmission means and operatively connected to drive said front vehicle wheels, said driving means including a wheel driving shaft and a power shaft positioned in said vertical central longitudinal plane of the vehicle and below the lowermost position of the crank pins of the engine crankshaft and above the horizontal plane containing the axis of the wheel driving shaft.

3. In a vehicle of the character described, the combination of a chassis and engine supported thereby, said engine provided with aligned cylinders having axes inclined with respect to the vertical central longitudinal plane of the vehicle, said engine being further provided with a crankshaft having an axis contained in said vertical central longitudinal plane of the vehicle, vehicle wheels adapted to be driven by said engine and located adjacent to one end of the engine, power transmission means positioned adjacent to the other end of said engine, and driving means extending from said power transmission means and operatively connected to drive said front vehicle wheels, said driving means including a power shaft extending substantially from end to end of said engine and a wheel driving shaft driven from said power shaft, the horizontal plane containing the axis of the power shaft lying intermediate the horizontal planes containing respectively the crankshaft axis and the axis of said wheel driving shaft.

4. In a vehicle of the character described, the combination of a chassis and engine supported thereby, said engine comprising opposed cylinders extending in a horizontal plane, front vehicle wheels adapted to be driven by said engine, power transmission means positioned rearwardly of said engine, and driving means extending from said power transmission means and operatively connected to drive said front vehicle wheels, said driving means including a power shaft positioned below the horizontal plane containing the axes of the cylinders.

5. In a vehicle of the character described, the combination of a chassis and engine supported thereby, said engine comprising opposed cylinders extending in a horizontal plane, front vehicle wheels adapted to be driven by said engine, power transmission means positioned rearwardly of said engine, and driving means extending from said power transmission means and operatively connected to drive said front vehicle wheels, said driving means including a power shaft and a wheel driving shaft driven from said power shaft, the horizontal plane containing the axis of the power shaft lying intermediate the horizontal planes containing respectively the axes of the cylinders and the axis of said wheel driving shaft.

6. In a vehicle of the character described, the combination of a chassis and engine supported thereby, said engine comprising opposed cylinders extending in a horizontal plane, front vehicle wheels adapted to be driven by said engine, power transmission means positioned rearwardly of said engine, and driving means extending from said power transmission means and operatively connected to drive said front vehicle wheels, said driving means including a power shaft and a wheel driving shaft driven from said power shaft, the horizontal plane containing the axis of the power shaft lying substantially midway of the horizontal planes containing respectively the axes of the cylinders and the axis of said wheel driving shaft.

7. In a vehicle of the character described, the combination of a chassis and engine supported thereby, said engine comprising a pair of cylinders extending substantially in opposite directions, a crankshaft, the axes of said cylinders intersecting substantially in the crankshaft axis, front vehicle wheels adapted to be driven by said engine, power transmission means positioned rearwardly of said engine, and driving means extending from said power transmission means and operatively connected to drive said front vehicle wheels, said driving means including a power shaft positioned below the horizontal plane containing the crankshaft axis and above the horizontal plane containing the wheel axes.

8. In a vehicle of the character described, the combination of a chassis and engine supported thereby, said engine comprising a pair of cylinders extending substantially in opposite directions, a crankshaft, the axes of said cylinders intersecting substantially in the crankshaft axis, front vehicle wheels adapted to be driven by said engine, power transmission means positioned rearwardly of said engine, and driving means extending from said power transmission means and operatively connected to drive said front vehicle wheels, said driving means including a power shaft and a wheel driving shaft driven from said power shaft, said power shaft positioned below the horizontal plane containing the crankshaft axis and above the horizontal plane containing the axis of said wheel driving shaft.

9. In a vehicle of the character described, the combination of a chassis frame and engine supported thereby, said engine comprising a pair of horizontally opposed cylinders and a crankshaft positioned intermediate the cylinders and substantially above the horizontal plane of the chassis, front vehicle wheels adapted to be driven by said engine, power transmission means positioned rearwardly of said engine, a wheel driving shaft positioned forwardly of the engine, a valve shaft operatively connected with said crankshaft and positioned in a horizontal plane above the crankshaft axis, and driving means extending from said power transmission means and operatively connected to drive said front vehicle wheels, said driving means including a power shaft connected in driving relation with said wheel driving shaft, said wheel driving shaft and said power shaft positioned below the horizontal plane containing the crankshaft axis.

10. In a vehicle of the character described, the combination of a chassis frame and engine supported thereby, said engine comprising a pair of horizontally opposed cylinders and a crankshaft positioned intermediate the cylinders, front vehicle wheels adapted to be driven by said engine, power transmission means positioned rearwardly of said engine, a valve shaft operatively connected with said crankshaft and positioned in a horizontal plane above the crankshaft axis, and driving means extending from said power transmission means and operatively connected to drive said front vehicle wheels, said driving means including a power shaft and a wheel driving shaft driven from said power shaft, said power shaft positioned below the horizontal plane containing the crankshaft axis and above the horizontal plane containing the axis of said wheel driving shaft.

11. In a vehicle of the character described, the combination of a chassis consisting of a pair of frame members and an engine supported by and above said frame members, said engine comprising a pair of horizontally opposed cylinders and a crankshaft positioned intermediate the cylinders, a crankcase depending intermediate said chassis frame members, front vehicle wheels adapted to be driven by said engine, power transmission means positioned rearwardly of said engine, a valve shaft operatively connected with said crankshaft and positioned in a horizontal plane above the crankshaft axis, and driving means extending from said power transmission means and operatively connected to drive said front vehicle wheels, said driving means including a wheel driving shaft and a power shaft extending longitudinally through said crankcase, said power shaft connected in driving relation with said wheel driving shaft and positioned below the horizontal plane containing the crankshaft axis and above the horizontal plane containing the axis of said wheel driving shaft.

12. In a vehicle of the character described, the combination of a chassis comprising a pair of chassis frames extending longitudinally of the vehicle and an engine supported by and above said chassis frames, an engine crankcase depending intermediate said chassis frames, front vehicle wheels adapted to be driven by said engine, power transmission means positioned rearwardly of said engine, and driving means extending from said power transmission means and operatively connected to drive said front vehicle wheels, said driving means including a power shaft and a wheel driving shaft driven by said power shaft, said power shaft extending longitudinally through said crankcase and positioned intermediate the horizontal planes respectively containing the axis of the crankshaft and the axis of the wheel driving shaft.

13. In a vehicle of the character described, the combination with a chassis, of front vehicle wheels, and a unitary power plant and associated front wheel drive mechanism comprising an engine, a power transmission means positioned rearwardly of the engine, and a driving means operatively connecting said power transmission means with said front vehicle wheels, said driving means including a power shaft and a front wheel driving shaft driven from said power shaft, said power shaft extending forwardly from said power transmission means and positioned intermediate the horizontal planes containing respectively the axis of the engine crankshaft and the axis of the wheel driving shaft.

14. In a vehicle of the character described, the combination of a chassis comprising side frame members, front vehicle wheels supported thereby, an engine supported by said side frame members and including a crankshaft, and front wheel driving mechanism, including a power transmission operatively connected with said engine and located to the rear thereof and a drive shaft extending forwardly from said power transmission below a horizontal engine plane containing the crankshaft axis and located intermediate the chassis side frame members and above a horizontal plane containing the lower edge of said frame members.

15. In a vehicle of the character described, the combination of a chassis comprising side frame members, front vehicle wheels supported thereby, an engine supported by and substantially above said side frame members and including a crankshaft, and front wheel driving mechanism including a power transmission operatively connected with said engine and located to the rear thereof, a drive shaft extending forwardly from said power transmission below a horizontal engine plane containing the crankshaft axis and located between and substantially in the horizontal plane of the chassis side frame members, and a wheel driving shaft extending beneath the side frame members and below the horizontal plane containing the axis of said drive shaft.

16. In a vehicle of the character described, the combination of a chassis comprising side frame members, front vehicle wheels supported thereby, an engine provided with a crankshaft and with cylinders having their axes contained in a substantial horizontal plane, said engine supported on the top of said frame members, and front wheel driving mechanism including a wheel driving shaft positioned below said side frame members, a power transmission, operatively connected with said engine crankshaft, and a drive shaft extending from said power transmission and operatively connected with said wheel driving shaft, said drive shaft positioned in a horizontal plane intermediate the horizontal planes containing respectively the crankshaft and wheel driving shafts and located between the chassis side frame members.

17. A power plant assembly for a vehicle of the type described comprising an engine including a crankshaft, a casing secured to one end of the engine structure, a power transmission housed within said casing, a second casing secured to the other end of the engine structure, vehicle wheel driving mechanism housed within said second casing and a drive shaft for operatively connecting said power transmission with said vehicle wheel driving mechanism and extending substantially from end to end of said engine substantially parallel with and below the engine crankshaft.

18. A power plant assembly for a vehicle of the type described comprising an engine including a crankshaft, a casing secured to one end of the engine structure, a power transmission housed within said casing, a second casing secured to the other end of the engine structure, vehicle wheel driving mechanism housed within said second casing and a drive shaft for operatively connecting said power transmission with said vehicle wheel driving mechanism and extending substantially from end to end of said engine substantially parallel with and below the engine crankshaft, said wheel driving mechanism including a wheel driving shaft extending transversely of said drive shaft and positioned in a plane lying below the horizontal plane through the drive shaft axis.

19. In a vehicle, a chassis, an engine supported adjacent one end of the chassis and including a crankshaft, vehicle driving wheels and an associated wheel driving shaft adjacent that end of the engine adjacent the aforesaid end of the chassis and driven by the engine, said engine including horizontally opposed cylinders overlying the chassis, power transmission means positioned adjacent the other end of the engine inwardly of the aforesaid end of the chassis, and driving means extending from said power transmission means and including a power shaft operatively connected in driving relation with said wheel driving shaft, said power shaft positioned substantially below the horizontal plane containing the cylinder axes.

20. In a vehicle, a chassis, an engine supported adjacent one end of the chassis and including a crankshaft, vehicle driving wheels and an associated wheel driving shaft adjacent that end of the engine adjacent the aforesaid end of the chassis and driven by the engine, said engine including horizontally opposed cylinders overlying the chassis, power transmission means positioned adjacent the other end of the engine inwardly of the aforesaid end of the chassis and driving means extending from said power transmission means and including a power shaft operatively connected in driving relation with said wheel driving shaft, said power shaft positioned intermediate horizontal planes containing respectively the axis of the wheel driving shaft and the axes of the cylinders.

21. In a vehicle, a chassis, an engine supported adjacent one end of the chassis and including a crankshaft, vehicle driving wheels and an associated wheel driving shaft adjacent that end of the engine adjacent the aforesaid end of the chassis and driven by the engine, said engine including horizontally opposed cylinders overlying the chassis, power transmission means positioned adjacent the other end of the engine inwardly of the aforesaid end of the chassis and driving means extending from said power transmission means and including a power shaft operatively connected in driving relation with said wheel driving shaft, said power shaft positioned intermediate horizontal planes containing respectively the axis of the wheel driving shaft and the axes of the cylinder and substantially in the horizontal plane of the chassis.

22. In a vehicle, a chassis, an engine supported adjacent one end of the chassis and including a crankshaft, vehicle driving wheels and an associated wheel driving shaft adjacent that end of the engine adjacent the aforesaid end of the chassis and driven by the engine, said engine including horizontally opposed cylinders overlying the chassis, power transmission means positioned adjacent the other end of the engine inwardly of the aforesaid end of the chassis and driving means extended from said power transmission means and including a power shaft operatively connected in driving relation with said wheel driving shaft, said power shaft positioned intermediate horizontal planes containing respectively the axis of the wheel driving shaft and the axes of the cylinder and substantially in the horizontal plane of the chassis, the said engine crankshaft lying in a horizontal plane extending substantially above the chassis upper edge.

23. In a vehicle of the character described, the combination of a chassis, an engine of the type including a crankshaft and horizontally opposed cylinders overlying the chassis, said engine having a crankcase depending beneath the crankshaft, a drive shaft positioned below the crankshaft and extending substantially from end to end of the engine through said crankcase, and power transmitting means connecting the drive shaft with said crankshaft.

24. In a vehicle of the character described, the combination of a chassis, an engine of the type including a crankshaft and horizontally opposed cylinders overlying the chassis, said engine having a crankcase depending beneath the crankshaft, a drive shaft positioned in a horizontal plane below the crankshaft and extending substantially parallel with the crankshaft axis and from end to end of the engine through said crankcase, and power transmitting means connecting the drive shaft with said crankshaft at one end of the engine.

25. In a vehicle of the character described, the combination of a chassis, an engine of the type including a crankshaft and horizontally opposed cylinders overlying the chassis, said engine having a crankcase depending beneath the crankshaft, a drive shaft positioned in a horizontal plane below the crankshaft and extending substantially parallel with the crankshaft axis and from end to end of the engine through said crankcase, and a power transmitting means including a clutch and transmission for connecting the drive shaft with said crankshaft, said means located at one end of the engine.

26. In a vehicle of the character described, the combination with a chassis, of vehicle wheels adjacent one end of the chassis, an engine structure having a crankshaft and horizontally opposed cylinders, a unitary variable speed power transmission assembly removably secured to one end of the engine structure and having a power take-off shaft offset with respect to said crankshaft axis, a driving shaft housed within the engine structure and extending longitudinally of the engine, and means supported adjacent the other end of said engine for connecting said driving shaft with said vehicle wheels.

27. In a vehicle of the character described, the combination with a chassis, of vehicle wheels adjacent one end of the chassis, an engine structure having a crankshaft and horizontally opposed cylinders, a unitary variable speed power transmission assembly removably secured to one end of the engine structure and having a power take-off shaft offset with respect to said crankshaft axis, a driving shaft housed within the engine structure and extending longitudinally of the engine, and means supported adjacent the other end of said engine for connecting said driving shaft with said vehicle wheels, said means including a wheel driving shaft extending transversely of the vehicle.

28. In a vehicle of the character described, the combination with a chassis, of vehicle wheels adjacent one end of the chassis, an engine structure having a crankshaft and horizontally opposed cylinders, a unitary variable speed power transmission assembly removably secured to one end of the engine structure and having a power take-off shaft offset with respect to said crankshaft axis, a driving shaft housed within the engine structure and extending longitudinally of the engine, and means supported adjacent the other end of said engine for connecting said driving shaft with said vehicle wheels, said means including a wheel driving shaft extending transversely of the vehicle, said driving shaft extending above the horizontal plane containing the axis of the wheel driving shaft.

ANDRE J. MEYER.